(12) United States Patent
Hirotsu et al.

(10) Patent No.: US 11,548,647 B2
(45) Date of Patent: Jan. 10, 2023

(54) AIR-CONDITIONING DUCT STRUCTURE OF AIRCRAFT, AIRCRAFT, AND METHOD OF MANUFACTURING AIRCRAFT

(71) Applicant: Mitsubishi Aircraft Corporation, Aichi (JP)

(72) Inventors: Satoshi Hirotsu, Tokyo (JP); Takashi Ishimaru, Tokyo (JP); Yuichiro Shimura, Tokyo (JP); Yasunari Tanaka, Aichi (JP); Fumio Kondo, Tokyo (JP)

(73) Assignee: Mitsubishi Aircraft Corporation, Aichi (JP)

( * ) Notice: Subject to any disclaimer, the term of this patent is extended or adjusted under 35 U.S.C. 154(b) by 274 days.

(21) Appl. No.: 16/718,882

(22) Filed: Dec. 18, 2019

(65) Prior Publication Data

US 2020/0231287 A1 Jul. 23, 2020

(30) Foreign Application Priority Data

Jan. 18, 2019 (JP) .............................. JP2019-006461

(51) Int. Cl.
  *B64D 13/00* (2006.01)
  *B64D 13/06* (2006.01)
  (Continued)

(52) U.S. Cl.
  CPC ............... *B64D 13/06* (2013.01); *B64F 5/10* (2017.01); *F24F 13/0236* (2013.01)

(58) Field of Classification Search
  CPC .. B64D 2013/003; B64D 13/06; B64D 13/00; B64D 13/08; B64D 2013/0625
  (Continued)

(56) References Cited

U.S. PATENT DOCUMENTS 5,695,396 A * 12/1997 Markwart .............. B64D 13/00
                                                    454/71
5,897,079 A    4/1999 Specht et al.
(Continued)

FOREIGN PATENT DOCUMENTS

JP     H01-178536 U    12/1989
JP     2002-228542 A    8/2002
(Continued)

OTHER PUBLICATIONS

Notice of Reasons for Refusal issued in corresponding Japanese Patent Application No. 2019-006461, dated Nov. 22, 2022 (6 pages).

*Primary Examiner* — Ko-Wei Lin
(74) *Attorney, Agent, or Firm* — Osha Bergman Watanabe & Burton LLP (57) ABSTRACT

An air-conditioning duct structure of an aircraft includes an air-conditioning duct that is provided on each of a starboard side and a port side and guides conditioned air to a vicinity of a ceiling of a cabin in the aircraft. The air-conditioning duct includes a blowout portion and a blowout upstream portion. The blowout portion blows out the conditioned air to the cabin from an outboard side of the ceiling to an inboard side of the ceiling and toward a lower part than the ceiling, and the blowout upstream portion communicates with an upstream side of the blowout portion. In addition, the blowout portion or the blowout upstream portion is curved to cause a terminal end side of the blowout portion to be inclined downward with respect to a horizontal direction.

14 Claims, 8 Drawing Sheets

(51) Int. Cl.
*F24F 13/02* (2006.01)
*B64F 5/10* (2017.01)

(58) Field of Classification Search
USPC .............................................. 454/76, 77, 71
See application file for complete search history.

(56) References Cited

U.S. PATENT DOCUMENTS

| | | | | |
|---|---|---|---|---|
| 7,575,773 | B2 * | 8/2009 | Ishizuka | ................. B05D 7/04 |
| | | | | 427/377 |
| 10,081,429 | B2 | 9/2018 | Trudeau | |
| 2007/0164158 | A1 | 7/2007 | Buchholz et al. | |
| 2009/0298408 | A1 * | 12/2009 | Reisbach | ............... B64D 13/00 |
| | | | | 454/76 |
| 2010/0009617 | A1 | 1/2010 | Huber et al. | |
| 2010/0240290 | A1 * | 9/2010 | Markwart | .............. B64D 13/00 |
| | | | | 454/71 |
| 2015/0063995 | A1 * | 3/2015 | Rivera | ...................... F04D 3/00 |
| | | | | 415/207 |
| 2015/0069182 | A1 * | 3/2015 | Jacobsen | ............. B64D 11/003 |
| | | | | 244/118.5 |
| 2015/0344045 | A1 * | 12/2015 | Kondo | .............. B60H 1/00371 |
| | | | | 454/109 |

FOREIGN PATENT DOCUMENTS

JP 2009-525910 A 7/2009
JP 2016-155537 A 9/2016

* cited by examiner

EMBODIMENT

FIG. 6B

COMPARATIVE
EXAMPLE

AIR-CONDITIONING DUCT STRUCTURE OF AIRCRAFT, AIRCRAFT, AND METHOD OF MANUFACTURING AIRCRAFT

BACKGROUND OF THE INVENTION

Field of the Invention

The present invention is an air-conditioning duct structure configuring an air conditioning system of an aircraft, an aircraft including the air-conditioning duct structure, and a method of manufacturing the aircraft.

Description of the Related Art

An air conditioning system of an aircraft supplies conditioned air obtained from engine bleed air and external air to compartments such as a cabin. An air-conditioning duct through which the conditioned air flows is provided on each of a starboard side and a port side of the cabin. The conditioned air that has been guided to, for example, a vicinity of a ceiling of the cabin and a vicinity of an overhead baggage storage portion through the air-conditioning duct is blown out from blowout ports to an inside of the cabin.

As described in JP 2009-525910 W, each of the blowout ports is formed in, for example, a square shape.

It is desirable to supply the conditioned air to a lower part of each of seats by blowing out the conditioned air along a right-left direction of the cabin from a pair of a blowout port provided on a member near the ceiling on the starboard side and a blowout port provided on a member near the ceiling on the port side, and downwardly blowing flow merged at a position of a passage corresponding to a center part in the right-left direction.

However, if the flow of the conditioned air jetted from the blowout port on the starboard side and the flow of the conditioned air jetted from the blowout port on the port side suck down the surrounding air, and are attracted to and adhere to the upper ceiling due to Coanda effect, the conditioned air is difficult to reach the lower part. In particular, this is especially difficult in heating in which warm conditioned air is blown out. When the conditioned air does not reach the lower part, temperature difference in the vertical direction inside the cabin becomes large.

In addition, when the inventor of the present invention analyzes the flow adhering to the ceiling from the blowout ports in a flow field, it was found that even when the conditioned air is blown out from the blowout port on the starboard side and from the blowout port on the port side at substantially equal flow speed, a merging position of jet flows is deviated to a right side or a left side from the center part of the cabin in the right-left direction.

It is considered that when the state where the jet flows of the conditioned air adhere to the surface of the ceiling is maintained due to Coanda effect, the merging position of the jet flows is deviated to the right side or the left side even by slight energy difference between the jet flow from the starboard side and the jet flow from the port side.

If the square blowout ports described in JP 2009-525910 W are symmetrically disposed on the members near the ceiling so as to blow out the conditioned air toward the center in the right-left direction, the conditioned air adheres to the ceiling in a manner similar to the above, and the merging position of the jet flows is deviated.

When the merging position is deviated, symmetry in the right-left direction of the wind that is blown downward from the merging position just below the ceiling is deteriorated. For example, if the merging position is deviated to the right side, the wind speed (flow speed) at the seats on the right side of the passage is high and the wind speed (flow speed) at the seats on the left side of the passage is low, and deviation occurs on the wind speed distribution inside the cabin.

An object of the present invention is to achieve, in the configuration in which the conditioned air is blown out from the blowout port on the starboard side and the blowout port on the port side that are located near the ceiling through the air-conditioning duct of the aircraft, at least any of supply of the conditioned air to the lower part of the compartment and uniformization of wind speed distribution in the right-left direction by preventing adhesion of the conditioned air to the ceiling.

SUMMARY OF THE INVENTION

An air-conditioning duct structure of an aircraft according to the present invention includes an air-conditioning duct that is provided on each of a starboard side and a port side of a pressurized compartment of the aircraft and is configured to guide conditioned air to a vicinity of a ceiling of the pressurized compartment of the aircraft.

In the present invention, the air-conditioning duct on each of the starboard side and the port side includes a blowout portion and a blowout upstream portion. The blowout portion blows out the conditioned air to the pressurized compartment from an outboard side of the ceiling to an inboard side of the ceiling and toward a lower part than the ceiling, and the blowout upstream portion communicates with an upstream side of the blowout portion. In addition, the blowout portion or the blowout upstream portion is curved to cause a terminal end side of the blowout portion to be inclined downward with respect to a horizontal direction.

In the air-conditioning duct structure of the aircraft according to the present invention, the ceiling is preferably exposed between a baggage storage portion on the starboard side and a baggage storage portion on the port side in a right-left direction, and the baggage storage portion on the starboard side and the baggage storage portion on the port side are located above seats of a cabin as the pressurized compartment. The blowout portion on the starboard side preferably opens above the baggage storage portion on the starboard side, and the blowout portion on the port side preferably opens above the baggage storage portion on the port side.

In the air-conditioning duct structure of the aircraft according to the present invention, the blowout portion on the starboard side preferably opens near a right end of the ceiling and in a vicinity of a boundary between the baggage storage portion on the starboard side and the ceiling, and the blowout portion on the port side preferably opens near a left end of the ceiling and in a vicinity of a boundary between the baggage storage portion on the port side and the ceiling.

In the air-conditioning duct structure of the aircraft according to the present invention, the air-conditioning duct preferably extends between an inner wall of the cabin and a skin and between the baggage storage portion and the skin to the blowout portion.

In the air-conditioning duct structure of the aircraft according to the present invention, the blowout portion on the starboard side and the blowout portion on the port side are preferably configured in symmetrical shapes, and preferably each blow out the conditioned air in a direction forming an equal angle with respect to a horizontal direction.

In the air-conditioning duct structure of the aircraft according to the present invention, a position of a passage between seats on the starboard side and seats on the port side in the pressurized compartment preferably corresponds to a center part of the pressurized compartment in the right-left direction.

In the air-conditioning duct structure of the aircraft according to the present invention, the blowout portion preferably has a flow path cross-sectional area that is made larger than a flow path cross-sectional area of the blowout upstream portion.

In the air-conditioning duct structure of the aircraft according to the present invention, the blowout portion preferably has the flow path cross-sectional area that is made larger in an axis direction of the aircraft than the flow path cross-sectional area of the blowout upstream portion.

In the air-conditioning duct structure of the aircraft according to the present invention, the blowout portion preferably includes a rectification portion that rectifies flow of the conditioned air at a position where the flow path cross-sectional area is larger than the flow path cross-sectional area of the blowout upstream portion.

In the air-conditioning duct structure of the aircraft according to the present invention, the rectification portion is preferably made of a punching metal.

In the air-conditioning duct structure of the aircraft according to the present invention, the blowout portion preferably includes a widened portion and a flat portion. The widened portion is gradually expanded in the axis direction of the aircraft relative to the blowout upstream portion, and the flat portion communicates with a downstream side of the widened portion and has a flat cross-section.

In the air-conditioning duct structure of the aircraft according to the present invention, the blowout portion preferably includes a rectification portion that rectifies flow of the conditioned air at a position where the flow path cross-sectional area is larger than the flow path cross-sectional area of the blowout upstream portion, and the rectification portion is preferably provided in the flat portion.

In the air-conditioning duct structure of the aircraft according to the present invention, the blowout portion is preferably expanded in the axis direction of the aircraft relative to the blowout upstream portion, and a plurality of the blowout portions individually corresponding to a plurality of the air-conditioning ducts are preferably disposed along one straight line parallel to the axis direction with intervals. Each of the intervals is less than or equal to ½ of a length of each of the blowout portions in the axis direction.

In the air-conditioning duct structure of the aircraft according to the present invention, the blowout portion is preferably continuous along the axis direction of the aircraft, and preferably receives the conditioned air from a plurality of the blowout upstream portions configured to guide the conditioned air to a vicinity of the ceiling to blow out the conditioned air.

An aircraft according to the present invention includes the above-described air-conditioning duct structure and the pressurized compartment.

Further, a method of manufacturing an aircraft according to the present invention, includes providing a blowout portion on an air-conditioning duct. The air-conditioning duct is provided on each of a starboard side and a port side of the aircraft and configured to guide conditioned air to a vicinity of a ceiling of a pressurized compartment of the aircraft. The blowout portion blows out the conditioned air to the pressurized compartment from an outboard side of the ceiling to an inboard side of the ceiling and toward a lower part than the ceiling.

According to the present invention, the conditioned air is blown out from the blowout portion configuring a terminal end part of the air-conditioning duct to the pressurized compartment from the outboard side of the ceiling toward the inboard side of the ceiling and toward the lower part than the ceiling. Accordingly, it is possible to prevent jet flow of the blown-out conditioned air from adhering to the ceiling and to supply the conditioned air to the lower part of the pressurized compartment. Further, adhesion of the jet flow of the conditioned air to the ceiling is prevented, which makes it possible to uniformize the wind speed distribution in the right-left direction, including a region where the jet flow blown out from the starboard side and the jet flow blown out from the port side are merged and the merged flow is blown downward.

In the air-conditioning duct according to the present invention, the blowout portion or the blowout upstream portion is curved to cause the terminal end side of the blowout portion to be inclined downward to the downstream side with respect to the horizontal direction. Therefore, it is possible to arrange the air-conditioning duct in narrow gaps between the skin of the aircraft and any of the inner wall, the ceiling, and the like and to arrange the blowout portion downward.

DETAILED DESCRIPTION OF THE PREFERRED EMBODIMENT

An air-conditioning duct structure 100 (FIG. 3) of an aircraft 1 according to an embodiment of the present invention is described below with reference to accompanying drawings.

First, a configuration of a cabin 2 to which conditioned air is supplied through the air-conditioning duct structure 100 (FIG. 3) by an air conditioning system mounted on the aircraft 1 is described with reference to FIG. 1 to FIG. 3.

(Configuration of Cabin)

The air conditioning system of the aircraft 1 supplies conditioned air obtained from engine bleed air and external air to pressurized compartments such as the cabin 2 and an unillustrated cockpit, thereby performing pressurization, cooling/heating, and ventilation of the pressurized compartment.

Figure 1:
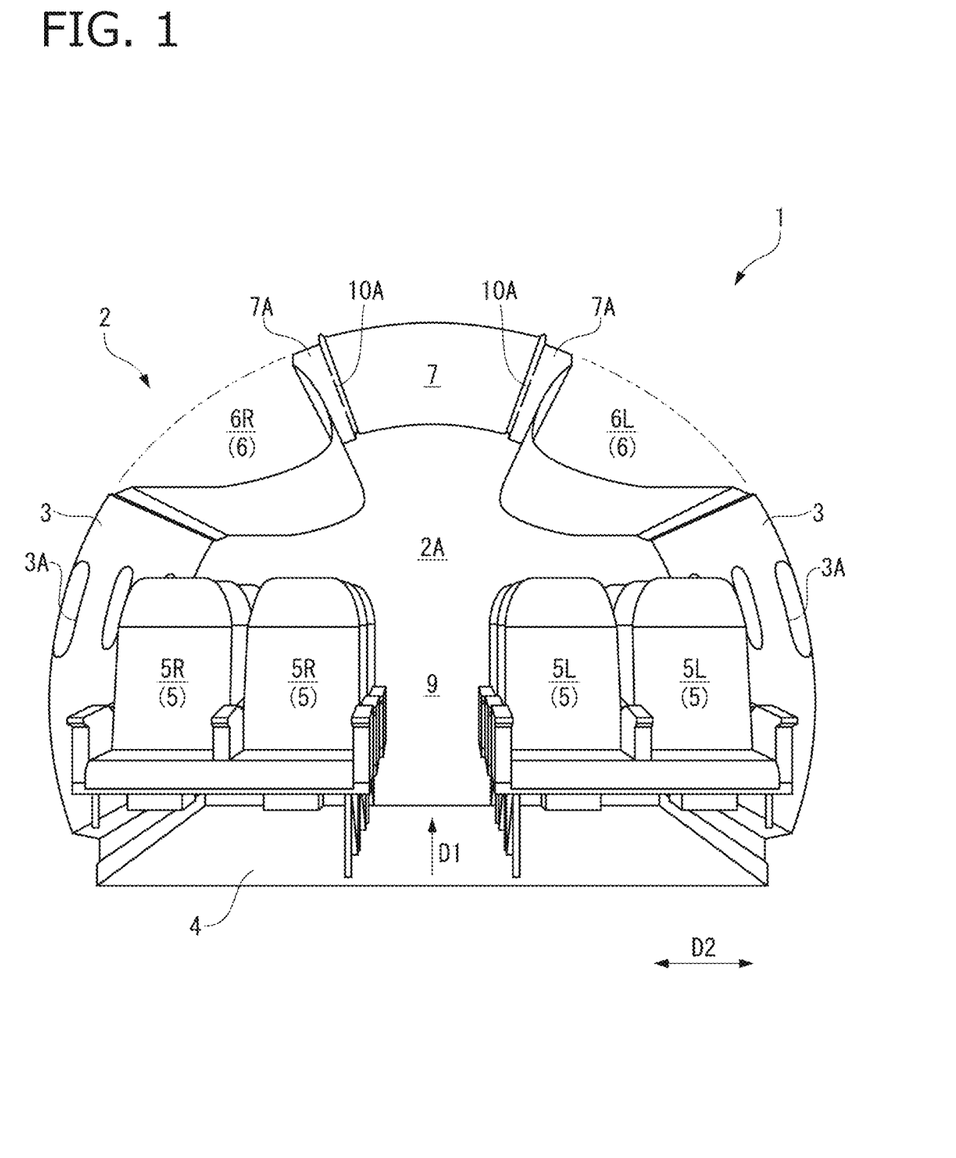
FIG. 1 is a perspective view illustrating a cabin of an aircraft according to an embodiment of the present invention.
Figure 2:
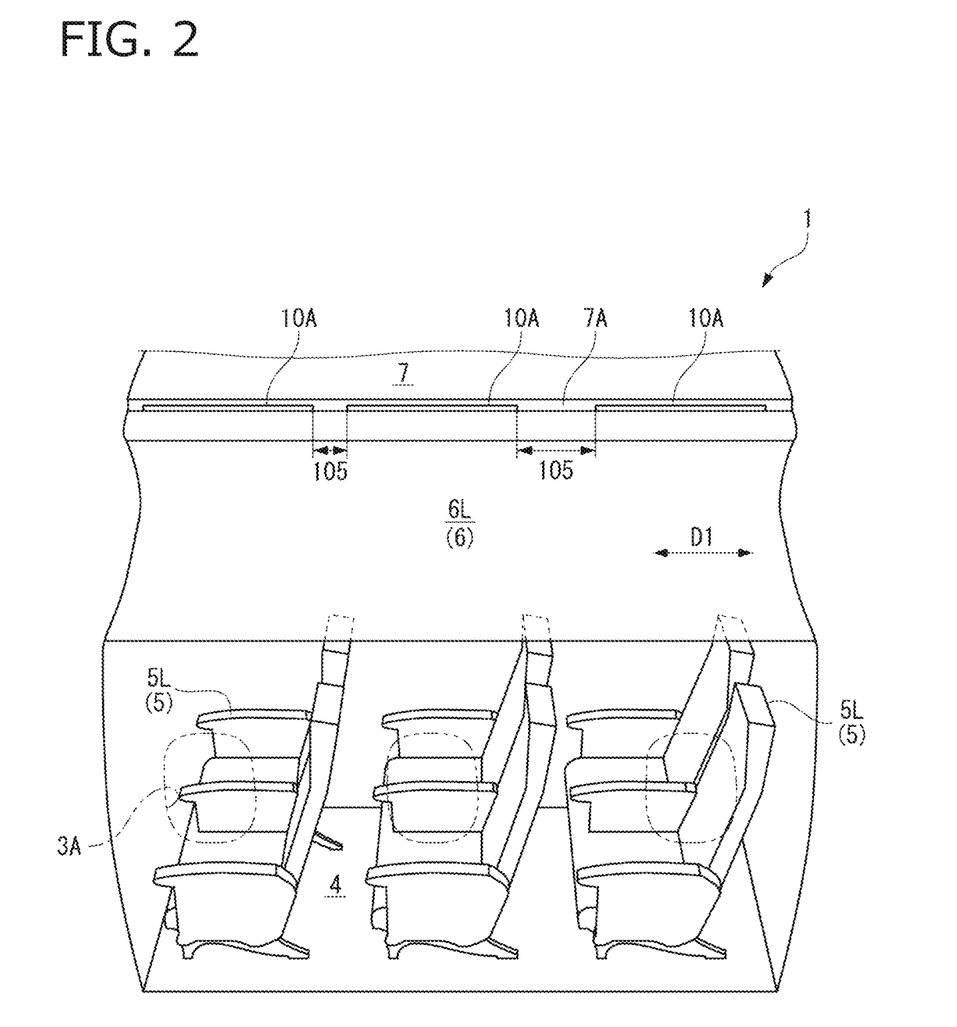
FIG. 2 is a perspective view illustrating the cabin illustrated in FIG. 1 through a wall from a side and illustrating a slit-like blowout port.
Figure 3:
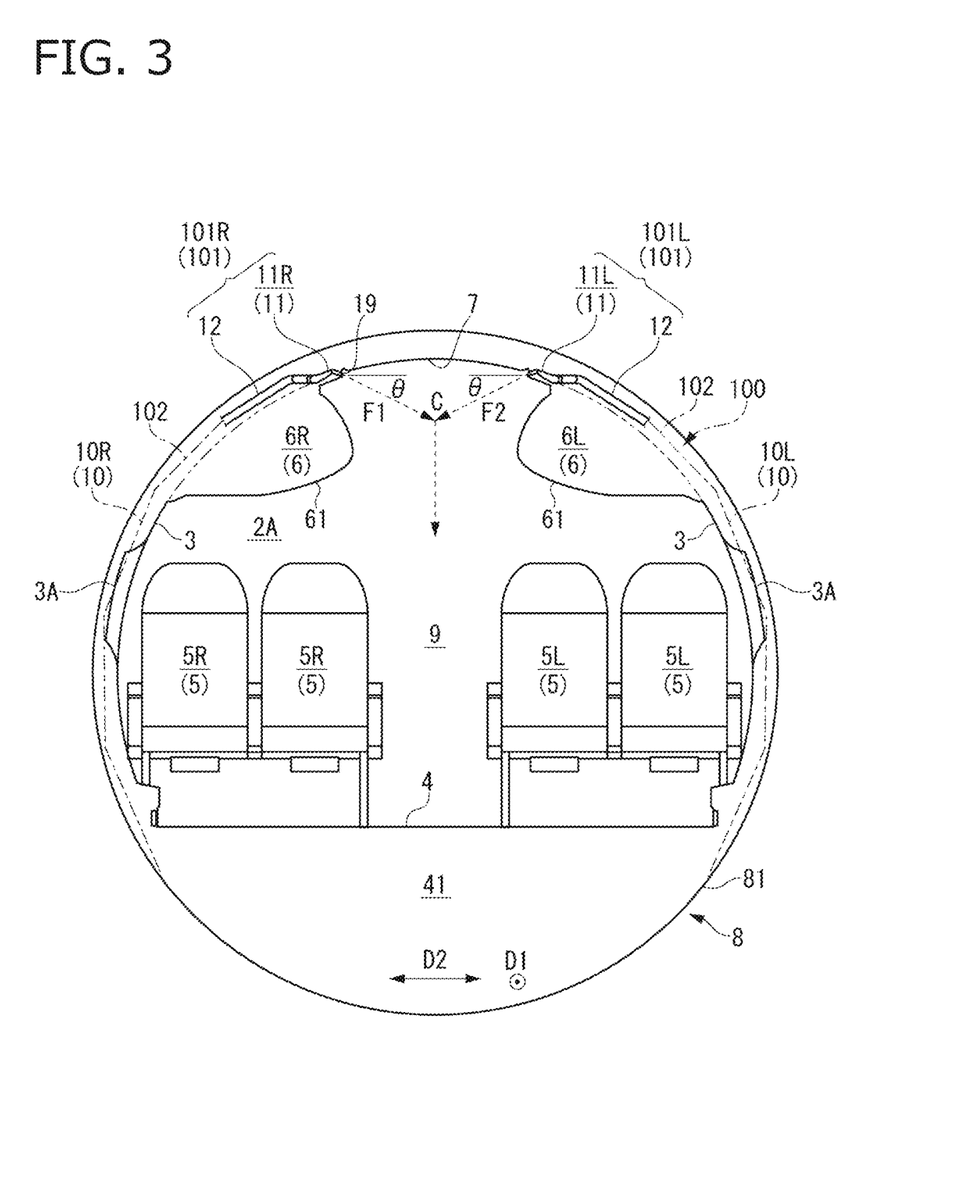
FIG. 3 is a front view illustrating the cabin illustrated in FIG. 1 and a blowout portion and a blowout upstream portion of an air-conditioning duct, and schematically illustrating flow of conditioned air jetted from the blowout portion.

FIG. 1 to FIG. 3 each illustrate an inner wall 3, a floor 4, seats 5, baggage storage portions 6, and a ceiling 7 of the cabin 2. The inner wall 3 is provided with window openings 3A.

In the present specification, a direction along an axis of an airframe of the aircraft is defined as an axis direction D1. A nose side in the axis direction D1 is referred to as "front", and a tail side is referred to as "rear".

A direction connecting a starboard side and a port side so as to be orthogonal to the axis is defined as a right-left direction D2. The starboard side is a right side of the axis and the port side is a left side of the axis based on the front and the rear described above. Further, an outside of the airframe in the right-left direction D2 is referred to as an outboard side, and an inside of the airframe is referred to as an inboard side.

An "upper side" and a "lower side" in the present specification are based on an upper side and a lower side in a vertical direction.

As illustrated in FIG. 1, a fuselage 8 of the airframe in which the cabin 2 is disposed typically has a circular cross-section. The inner wall 3 and the ceiling 7 of the cabin 2 are curved in a circular arc shape along a back side of a skin 81 of the fuselage 8.

The cabin 2 is preferably formed to have a shape symmetrical to the axis, inside the inner wall 3, the ceiling 7, and the floor 4.

The seats 5 are disposed on the starboard side and the port side of the cabin 2 with a passage 9 in between. The seats 5 are preferably disposed symmetrically to the axis from a viewpoint of weight balance of the airframe, and the like. In the present embodiment, seats 5R on the starboard side are arranged in two lines with predetermined intervals in the axis direction D1. Likewise, seats 5L on the port side are also arranged in two lines with predetermined intervals in the axis direction D1. A position of the passage 9 corresponds to a center part in the right-left direction D2.

The baggage storage portions 6 (6R and 6L) in which baggage is stored are also provided symmetrically to the axis. The baggage storage portions 6R on the starboard side are located above the seats 5R, and the baggage storage portions 6L on the port side are located above the seats 5L. The ceiling 7 is exposed between the baggage storage portions 6R and the baggage storage portions 6L in the right-left direction D2.

The conditioned air is blown out from blowout ports 10A that are located near the ceiling 7, to a space 2A that is surrounded by closed doors 61 of the baggage storage portions 6R and 6L, the ceiling 7, the inner wall 3, and the floor 4.

The conditioned air flowing through the cabin space 2A flows into an unillustrated exhaust duct from an exhaust port that is located, for example, near the floor 4.

As described below, wind speed distribution substantially symmetrical in the right-left direction D2 is provided to the cabin space 2A that has a right-left symmetrical shape.

Each of the blowout ports 10A is located at a terminal end part 19 of a blowout portion 11 of each of air-conditioning ducts 10R and 10L (FIG. 3). The blowout ports 10A are located above the baggage storage portions 6R and 6L near the ceiling 7. As illustrated in FIG. 1 and FIG. 2, the plurality of slit-like blowout ports 10A are arranged in the axis direction D1 with intervals each smaller than a length of each of the blowout ports 10A.

The conditioned air that has temperature, a flow rate, etc. controlled by the air conditioning system is supplied to each of the pressurized compartments through the air-conditioning ducts 10 (10R and 10L) provided on the starboard side and the port side of the airframe. FIG. 3 illustrates branch ducts that are a part of the air-conditioning ducts 10.

Each of the air-conditioning ducts 10 includes a mainstream portion (not illustrated) disposed in a space 41 below the floor 4 substantially along the axis direction D1, and a plurality of branch portions to which the conditioned air flowing through the mainstream portion is distributed.

Each of the branch portions of the air-conditioning ducts 10 illustrated in FIG. 3 extends upward between the inner wall 3 of the cabin 2 and the skin 81 from the unillustrated mainstream portions, and further extends upward between the baggage storage portions 6 and the skin 81 up to the corresponding blowout portion 11. The branch portions are mounted to unillustrated stringers or the like that support the skin 81 from the back side.

In the present embodiment, the blowout portion 11 individually corresponds to each of the branch portions of the air-conditioning ducts 10.

(Configuration of Terminal End Side of Air-Conditioning Duct)

The terminal end part 19 and the vicinity thereof of the air-conditioning duct structure 100 that includes the air-conditioning duct 10R and the air-conditioning duct 10L are described with reference to FIG. 3 to FIG. 5.

In FIG. 3, a terminal end section 101 that includes the terminal end part 19 and the vicinity thereof in each of the air-conditioning ducts 10R and 10L is illustrated by a solid line. The terminal end section 101 extends from the outboard side to the inboard side substantially along the back side of the skin 81. The terminal end section 101 is connected to an upstream section 102 extending upward between the inner wall 3 and the skin 81.

The terminal end section 101 and the upstream section 102 of each of the air-conditioning ducts 10R and 10L are typically made of a resin material.

The terminal end section 101 of the air-conditioning duct 10R on the starboard side includes the blowout portion 11 that blows out the conditioned air to the cabin 2 near the ceiling 7, and a blowout upstream portion 12 communicating with an upstream side of the blowout portion 11.

Likewise, the terminal end section 101 of the air-conditioning duct 10L on the port side includes the blowout portion 11 that blows out the conditioned air to the cabin 2 near the ceiling 7, and the blowout upstream portion 12 communicating with an upstream side of the blowout portion 11.

The blowout upstream portion 12 is a duct that has a cross-section in an appropriate shape such as a circular shape, an elliptical shape, and an oval shape. The blowout upstream portion 12 has a length arrangeable without interference with members such as the stringers and substantially entirely extends linearly between the baggage storage portion 6 and the skin 81.

Figure 4:
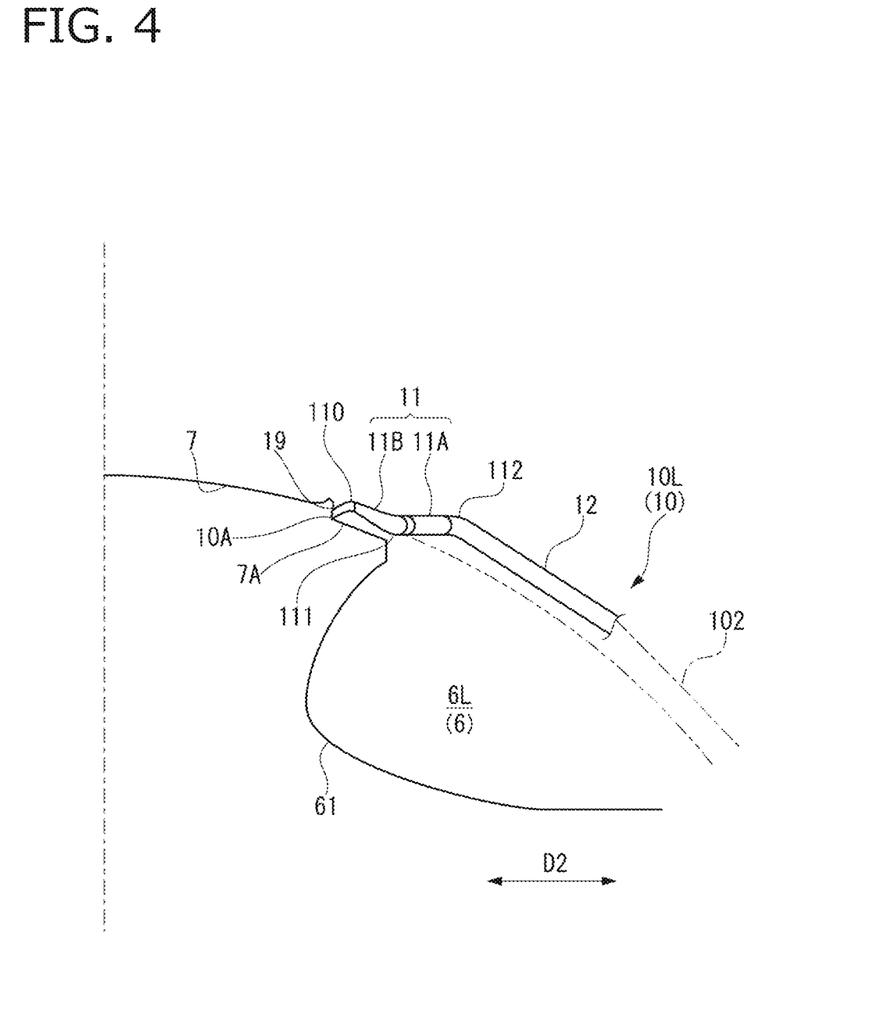
FIG. 4 is a partial enlarged view of FIG. 3.
Figure 5A:
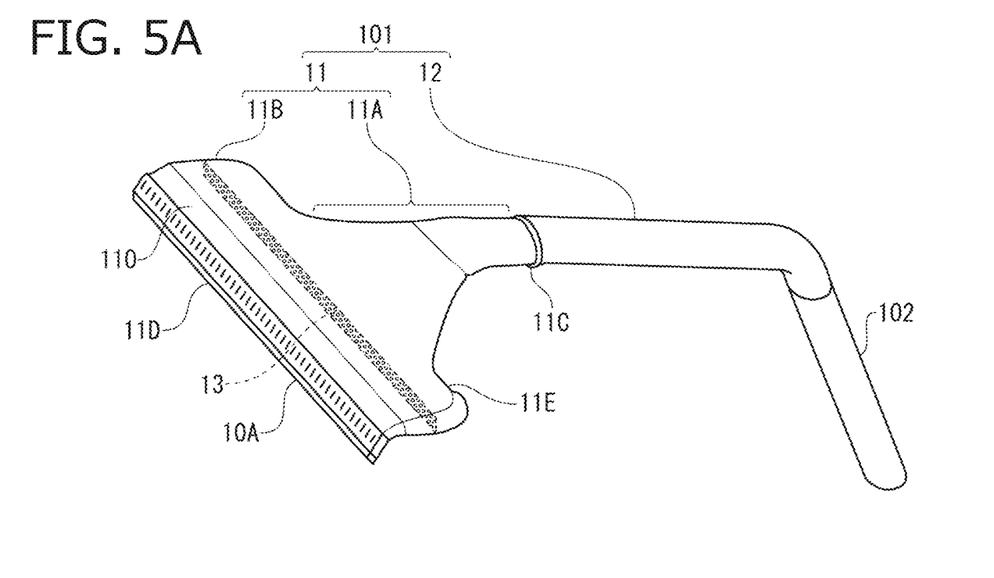
FIG. 5A is a perspective view illustrating the blowout portion and the blowout upstream portion of the air-conditioning duct according to the embodiment of the present invention.
Figure 5B:
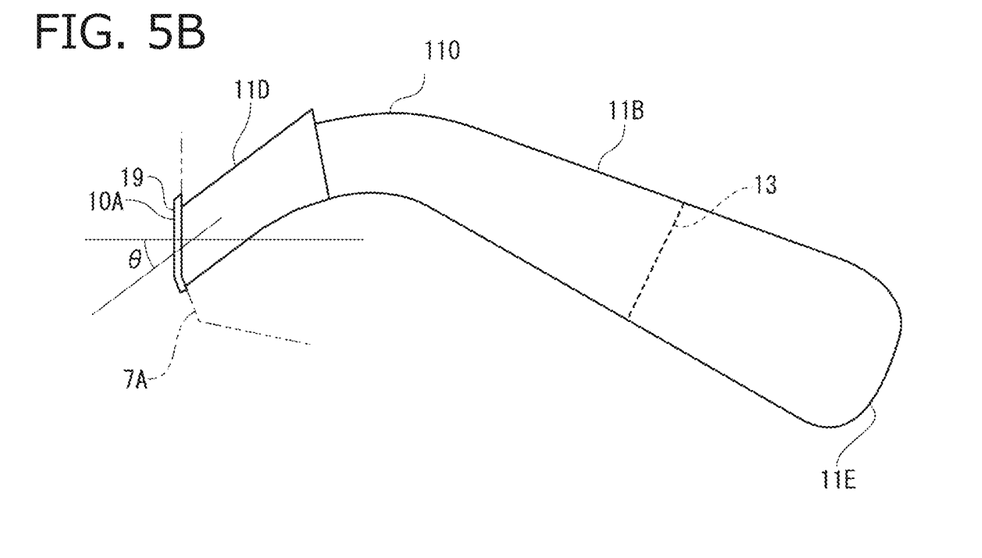
FIG. 5B is a diagram illustrating a terminal end part of the blowout portion in an enlarged manner.

As illustrated in FIG. 4 and FIG. 5B, the blowout portion 11 blows out the conditioned air from the outboard side of the ceiling 7 toward the inboard side of the ceiling 7 and toward a lower part than the ceiling 7. The blowout portion 11 is curved at a curved position 110 such that its terminal end side is inclined downward with respect to a horizontal direction.

The terminal end side of the blowout portion 11 is curved so as to be inclined downward toward a downstream side with respect to the horizontal direction. As illustrated in FIG. 4, each of the air-conditioning ducts 10 according to the present embodiment is curved at a plurality of positions in an extending direction including the curved position 110 of the blowout portion 11.

The terminal end section 101 (101R) of the air-conditioning duct 10R on the starboard side and the terminal end section 101 (101L) of the air-conditioning duct 10L on the port side have the same shape, and are disposed symmetrically to the axis as illustrated in FIG. 3. The terminal end sections 101R and 101L are disposed at the same position in the axis direction D1.

(Detailed Configuration of Blowout Portion)

A detailed configuration of the blowout portion 11 is described with reference to FIGS. 5A and 5B.

As illustrated in FIG. 5A, the blowout portion 11 preferably has a flow path cross-sectional area larger than a flow path cross-sectional area of the blowout upstream portion 12. Further, the blowout portion 11 preferably includes one or more rectification portions 13 that rectify the flow of the conditioned air at a position where the flow path cross-sectional area is larger than the flow path cross-sectional area of the blowout upstream portion 12.

The blowout portion 11 according to the present embodiment includes a widened portion 11A that is gradually expanded in the axis direction D1 relative to the blowout upstream portion 12, and a flat portion 11B that communicates with the downstream side of the widened portion 11A and has a flat cross-section. The blowout portion 11 is formed symmetrically to an axial center of the blowout upstream portion 12 in the axis direction D1.

The widened portion 11A has a shape in which a dimension in the vertical direction is slightly smaller than the dimension of the blowout upstream portion 12, and the dimension is gradually increased from a position 11C connected to the blowout upstream portion 12 toward both sides in the axis direction D1. The flow path cross-sectional area of the widened portion 11A is gradually increased relative to the flow path cross-sectional area of the blowout upstream portion 12.

The flat portion 11B has a width wider than the maximum width of the widened portion 11A, and is curved downward at the curved position 110 on the terminal end side, to the downstream side with respect to the horizontal direction. A flat cylindrical outlet member 11D that forms the corresponding blowout port 10A is separately provided at a terminal end part of the flat portion 11B.

As illustrated in FIG. 4, FIGS. 5A and 5B, the flat portion 11B opens to a member 7A provided on the ceiling 7, near the ceiling 7 above the baggage storage portion 6.

More specifically, the flat portion 11B on the starboard side opens near a right end of the ceiling 7 and in a vicinity of a boundary between the baggage storage portion 6R on the starboard side and the ceiling 7, and the flat portion 11B on the port side opens near a left end of the ceiling 7 and in a vicinity of a boundary between the baggage storage portion 6L on the port side and the ceiling 7.

When the outlet member 11D is attached from an indoor side to the flat portion 11B of the blowout portion 11 constructed inside the skin 81 of the fuselage 8 through an opening (not illustrated) formed on the member 7A, the blowout portion 11 can be fixed to the member 7A.

As illustrated in FIG. 2, the blowout ports 10A are disposed with predetermined intervals 105 along one straight line parallel to the axis direction D1. To uniformize the wind speed distribution of airflows blown out from the respective blowout ports 10A in the axis direction D1, the dimension of each of the intervals 105 is preferably minimized. For example, each of the intervals 105 preferably has a dimension less than or equal to ½ of a length of each of the blowout ports 10A in the axis direction D1.

The blowout ports 10A are more preferably arranged along the axis direction D1 with substantially no gap.

As illustrated in FIG. 4, the blowout portion 11 according to the present embodiment is curved in a gentle zigzag shape in a side view, from a position connected to the blowout upstream portion 12 to the corresponding blowout port 10A.

Note that it is sufficient for the blowout portion 11 or the blowout upstream portion 12 to be curved such that the terminal end side of the blowout portion 11 is inclined downward toward the downstream side with respect to the horizontal direction.

To arrange the air-conditioning ducts 10R and 10L along the gap between the skin 81 and the inner wall 3 and the gap between the skin 81 and the ceiling 7, and to cause the terminal end part 19 of each of the air-conditioning ducts 10R and 10L to be inclined downward with respect to the horizontal direction, the air-conditioning ducts 10R and 10L are each curved at appropriate positions at least in the terminal end section 101.

Specifically, in the blowout portion 11 according to the present embodiment, the widened portion 11A extends downward toward the downstream side in a direction intersecting the axis of the blowout upstream portion 12, and the flat portion 11B extends upward toward the downstream side in a direction intersecting the widened portion 11A.

The terminal end side of the blowout portion 11 including the plurality of curved positions 110, 111, and 112 is inclined at an angle $\theta$ with respect to the horizontal direction as illustrated in FIG. 5B.

As illustrated in FIG. 3, the blowout portion 11 of the air-conditioning duct 10R on the starboard side and the blowout portion 11 of the air-conditioning duct 10L on the port side each blow out the conditioned air to the cabin 2 in a direction forming the equal angle $\theta$ with respect to the horizontal direction.

As described below, in order to merge a jet flow from the blowout portion 11 on the starboard side and a jet flow from the blowout portion 11 on the port side to blow the merged flow downward toward the floor 4 of the passage 9 while preventing the flow of the conditioned air blown out from the blowout portion 11 from adhering to the ceiling 7, the angle $\theta$ on the terminal end side of the blowout portion 11 is preferably appropriately determined.

The configuration of the terminal end part of the flat portion 11B is not limited to the configuration according to the present embodiment, and the terminal end part of the flat portion 11B can be appropriately configured. For example, the outlet member 11D may not be attached to the terminal end part of the flat portion 11B and the terminal end part of the flat portion 11B may serve as one blowout port 10A, or the terminal end part of the flat portion 11B may be connected to the corresponding blowout port 10A formed on the member 7A.

The flat portion 11B is drastically expanded in the axis direction D1 in an axial-direction section shorter than the terminal end of the widened portion 11A. The conditioned air is expanded by the widened portion 11A and the flat portion 11B in the axis direction D1 (front-rear direction), and is jetted from the blowout port 10A to the cabin 2.

The rectification portion 13 (FIGS. 5A and 5B) is disposed inside the flat portion 11B in order to sufficiently expand the flow of the conditioned air in the axis direction D1 in a short section.

The rectification portion 13 rectifies the flow of the conditioned air at the position of the flat portion 11B where the flow path cross-sectional area is larger than the flow path cross-sectional area of the blowout upstream portion 12. The rectification portion 13 can suppress drift inside the duct generated along with drastic expansion of the flow path cross-sectional area. This uniformizes the flow of the conditioned air jetted from the slit-like blowout port 10A.

The rectification portion 13 is located on the downstream of a position 11E of the flat portion 11B at which the width thereof is drastically expanded. More specifically, the rectification portion 13 is located between the drastic-expanded position 11E and the curved position 110 of the flat portion 11B. The rectification portion 13 disposed on the upstream of the curved position 110 can sufficiently achieve rectification effect without influence of the drift at the curved position 110.

The rectification portion 13 can be configured by an appropriate member that can rectify the conditioned air, for example, a punching metal or a mesh member. The rectification portion 13 according to the present embodiment is configured by a punching metal, and is disposed orthogonal to the flow of the conditioned air.

The rectification portion 13 can be provided in the flat portion 11B by an appropriate method. The blowout portion 11 provided with the rectification portion 13 can be obtained by, for example, insert molding that is performed while the rectification portion 13 is disposed on a mold for injection molding of the blowout portion 11. Alternatively, the blowout portion 11 may be molded while being divided into a part on the upstream side and a part on the downstream side of a position where the rectification portion 13 is disposed, and the rectification portion 13 may be assembled to the blowout portion 11 so as to sandwich the rectification portion 13 between the part on the upstream side and the part on the downstream side of the blowout portion 11. In the latter case, the rectification portion 13 is preferably fitted into a notch provided on the duct.

The rectification portion 13 may be disposed in the widened portion 11A or in both of the widened portion 11A and the flat portion 11B. The rectification portion 13 may be disposed on the terminal end side of the curved position 110 in the flat portion 11B. To smoothly expand the conditioned air along with expansion of the flow path cross-sectional area, an appropriate number of rectification portions 13 may be disposed at appropriate positions.

Since the blowout portion 11 according to the present embodiment has the width that is drastically expanded and has the rectification portion 13, it is possible to expand the conditioned air to the necessary width in the axis direction D1 with the short axial-direction length. Since the blowout portion 11 has the short length in the axis direction and is flat, the blowout portion 11 meets demand of space saving in consideration of the dimension of the gap where the blowout portion 11 is installed.

(Action of Air-Conditioning Duct Structure)

Action of the air-conditioning duct structure 100 according to the present embodiment is described with reference to FIG. 3.

The conditioned air is blown out from the blowout portion 11 (11R) of the air-conditioning duct 10R on the starboard side, from the outboard side of the ceiling 7 toward the inboard side of the ceiling 7 and toward the lower part than the ceiling 7 as illustrated by a dashed arrow F1.

The conditioned air is also blown out from the blowout portion 11 (11L) of the air-conditioning duct 10L on the port side, from the outboard side of the ceiling 7 toward the inboard side of the ceiling 7 and toward the lower part than the ceiling 7 as illustrated by a dashed arrow F2.

The blowout portions 11R and 11L are directed downward at the equal angle θ, and the flow speeds of the conditioned air blown out from the blowout portions 11R and 11L are substantially equal to each other. Accordingly, the jet flow (F1) from the starboard side and the jet flow (F2) from the port side collide with and are merged with each other at the center part of the cabin 2 in the right-left direction, and the merged flow is blown downward while being diffused (see FIG. 6A).

Although the positions where the conditioned air is blown out from the blowout portions 11R and 11L are located near the ceiling 7, the terminal end sides of the respective blowout portions 11R and 11L are directed downward in a direction separating from the ceiling 7 as described above. This makes it possible to prevent the jet flows (F1 and F2) from being attracted to and adhering to the upper ceiling 7 due to Coanda effect. Since the conditioned air from the blowout portions 11R and 11L is jetted downward without being attracted to the upper ceiling 7, an effect enabling the jet flows (F1 and F2) to sufficiently reach the lower part of the seats 5 is achieved.

Figure 6A:
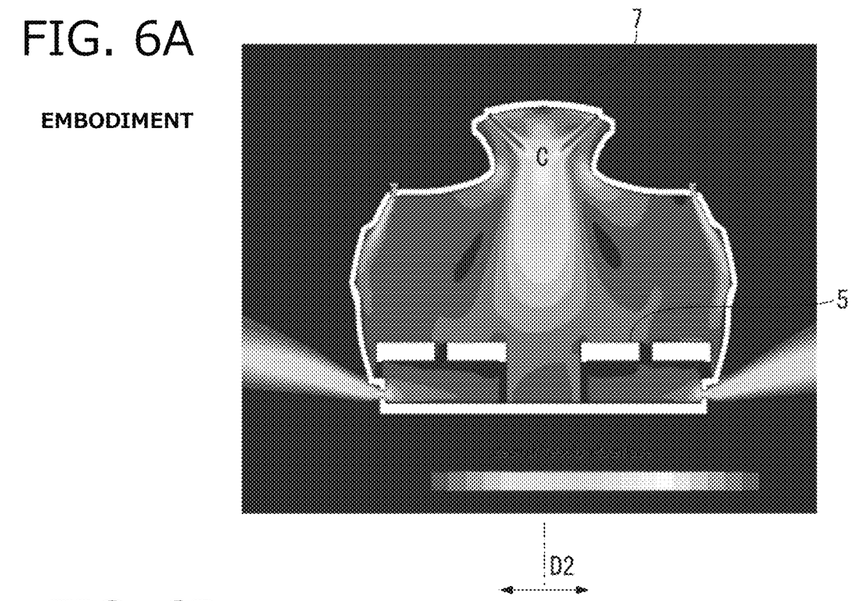
FIG. 6A is a diagram illustrating wind speed distribution according to the embodiment of the present invention, based on an analysis result.
Figure 6B:
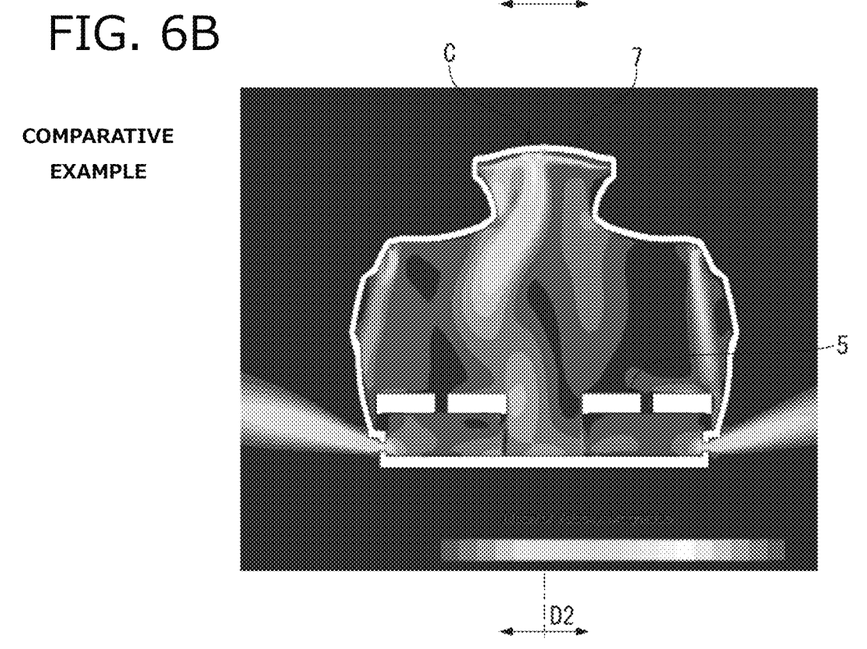
FIG. 6B is a diagram illustrating wind speed distribution according to a comparative example, based on an analysis result.

FIGS. 6A and 6B each illustrate the wind speed distribution in the cabin space 2A with color gradation, based on a result of analysis of a flow field of the conditioned air with use of a mock-up model of the cabin 2.

In FIG. 6A, the conditioned air is blown out from positions similar to the positions of the blowout portions 11, from the outboard side toward the inboard side and toward the lower part, based on condition setting corresponding to the blowout portions 11 and the blowout upstream portions 12 according to the present embodiment.

In a comparative example illustrated in FIG. 6B, ducts that include blowout ports each having a rectangular cross-section are used as the blowout portions, and the conditioned air is blown out from positions similar to the positions of the blowout portions 11, from the outboard side toward the inboard side in the horizontal direction. Each of the blowout ports of the ducts used in FIG. 6B has a large dimension (height) in the vertical direction and a small dimension (width) in the axis direction D1, as compared with each of the blowout ports 10A according to the present embodiment. Since the width of each of the blowout ports is small in the comparative example, an interval between the blowout ports adjacent in the axis direction D1 in the comparative example is larger than the interval between the adjacent blowout ports in the present embodiment.

An opening area of each of the blowout ports is substantially equivalent between the present embodiment and the comparative example. The flow path cross-sectional area of each of the blowout ports of the ducts according to the comparative example is made larger than the flow path cross-sectional area of a portion of the upstream thereof.

In the comparative example (FIG. 6B), the conditioned air blown out from the starboard side and the port side adheres to the ceiling 7. Accordingly, a region where the conditioned air does not reach the lower part of the seats 5 is present, and a merging position C is deviated from the center of the cabin 2 in the right-left direction D2. As a result, symmetry of the wind speed distribution of the blown-down flow is impaired. In the example illustrated in FIG. 6B, the merging position C is deviated to a left side (starboard side) in FIG. 6B. Therefore, the wind speed tends to be high at the seats 5R on the right side of the passage, and the wind speed tends to be low at the seats 5L on the left side of the passage. Difference of the wind speed leads to temperature difference.

In contrast, in the present embodiment (FIG. 6A) in which the conditioned air is blown out downward from the blowout portions 11, the flow of the conditioned air blown out from the starboard side and the port side is separated from the ceiling 7. Further, a flow field in which the wind speed distribution is substantially symmetrical in the right-left direction D2, including a region where the jet flow from the starboard side and the jet flow from the port side are merged and the merged flow is blown downward while being diffused, is provided to the cabin space 2A. According to the analysis result illustrated in FIG. 6A, the flow field with substantially uniform wind speed distribution is provided on both of the right and left sides of the passage 9.

As illustrated in FIG. 6A and FIG. 3, when the jet flows (F1 and F2) do not adhere to the ceiling 7, the jet flows (F1 and F2) of the conditioned air can reach the lower part of the seats 5 even in the case of the conditioned air in heating, and it is possible to prevent the merging position C from being deviated to the right side or the left side from the center in the right-left direction D2 due to difference of the wind force caused by slight difference of the flow speed between the jet flow F1 and the jet flow F2.

In the present embodiment, even if the flow speed is different between the conditioned air flowing through the blowout upstream portion 12 on the starboard side and the conditioned air flowing through the blowout upstream portion 12 on the port side, the flow of the conditioned air is expanded by the blowout portion 11 that is increased in the flow path cross-sectional area and is jetted downward as the jet flows (F1 and F2), and diffusion of the jet flows (F1 and F2) to the surrounding airflows progresses before merging. When the diffusion progresses, deviation of the flow speed between the starboard side and the port side hardly occurs. As a result, the conditioned air blown out from the blowout portion 11 on the starboard side and the conditioned air blown out from the blowout portion 11 on the port side are merged at the predetermined merging position C. In the comparative example of FIG. 6B, since the flow adhering to the ceiling 7 hardly causes diffusion, deviation of the flow speed between the starboard side and the port side influences the merging position C.

Even when the blowout portion 11 has a circular cross-section, a rectangular cross-section, or the like, if the flow path cross-sectional area of the blowout portion 11 is made larger than the flow path cross-sectional area of the blowout upstream portion 12, the state similar to the state according to the present embodiment occurs. Even in the form of the blowout port according to the comparative example illustrated in FIG. 6B, the direction of the blowout port is set so as not to blow out the conditioned air in the horizontal direction but to blow out the conditioned air toward the lower part as with the present embodiment, which improves asymmetry of the wind speed distribution.

According to the present embodiment, the flow merged at the merging position C that is the center part in the right-left direction D2 is blown downward to the passage 9 that is located at the center of the cabin 2 in the right-left direction D2. This makes it possible to avoid the wind from blowing to the seats 5, and also to avoid the wind speed distribution and the temperature distribution at the seats 5 from being deviated.

Note that it is permitted that the merging position C is periodically displaced in the right-left direction D2 due to fluctuation of the flow derived from a fan or the like, under the control of the air conditioning system.

Further, according to the present embodiment, the blowout ports 10A are arranged along the axis direction D1 with small intervals, which makes it possible to avoid deviation of the wind speed distribution of the cabin space 2A in the front-rear direction (D1). As a result, it is possible to avoid temperature variation in the front-rear direction (D1), for example, low temperature at the seats 5 near the blowout ports 10A and high temperature at the seats 5 far from the blowout ports 10A.

As described above, according to the present embodiment, it is possible to achieve all of supply of the conditioned air to the lower part of the cabin 2, uniformization of the wind speed distribution in the right-left direction D2, and uniformization of the wind speed distribution in the axis direction D1. Accordingly, the wind speed can be settled within a prescribed range over the entire cabin 2 to improve comfortableness of passengers.

When unevenness of temperature over the enter cabin 2 is eliminated by uniformization of the wind speed distribution, the air conditioning system is stably controlled based on representative temperature detected at one or a plurality of positions in the cabin 2 while suppressing a use amount of bleed air, because temperature variation of the conditioned air is small. In other words, the control is efficiently performed while suppressing the use amount of bleed air, which can contribute to reduction of fuel consumption.

According to the present embodiment, since the blowout portions 11 located at the terminal end parts of the air-conditioning ducts 10R and 10L are inclined downward with respect to the horizontal direction, it is possible to prevent adhesion of the jet flows (F1 and F2) to the ceiling 7 while the conditioned air is blown out from the vicinity of the ceiling 7.

Accordingly, it is sufficient to use the branch ducts of the conventional air-conditioning duct that guides the conditioned air to the vicinity of the ceiling 7 and to provide the downward blowout portions 11 at the terminal end sides of the respective branch ducts, which is economical. It is unnecessary to add the member such as the rectification member to each of the blowout portions 11, which is also economical. This makes it possible to uniformize the wind speed distribution while avoiding increase in airframe weight.

According to the above description, the air-conditioning duct structure 100 including the blowout portions 11 and the blowout upstream portions 12 according to the preset invention is suitable not only for the aircraft 1 newly manufactured but also for repair of the existing aircraft 1. In other words, in place of the terminal end parts of the air-conditioning ducts that supply the conditioned air to the pressurized compartments such as the cabin 2 of the existing aircraft, providing the blowout portions 11 makes it possible to prevent adhesion of the conditioned air to the ceiling 7 and to uniformize the wind speed distribution and the temperature distribution in the pressurized compartments.

Further, since the blowout portions 11 or the blowout upstream portions 12 are curved such that the terminal end sides of the blowout portions 11 are inclined downward to the downstream side with respect to the horizontal direction, the air-conditioning ducts 10R and 10L can be arranged in a narrow gap between the skin 81 and any of the inner wall 3, the baggage storage portions 6, and the like, and the blowout portions 11 can be disposed downward.

(Modification of Present Invention)

A modification relating to uniformization of the wind speed distribution of the cabin 2 in the axis direction D1 is described with reference to FIG. 7 and FIGS. 8A and 8B.

Figure 7:
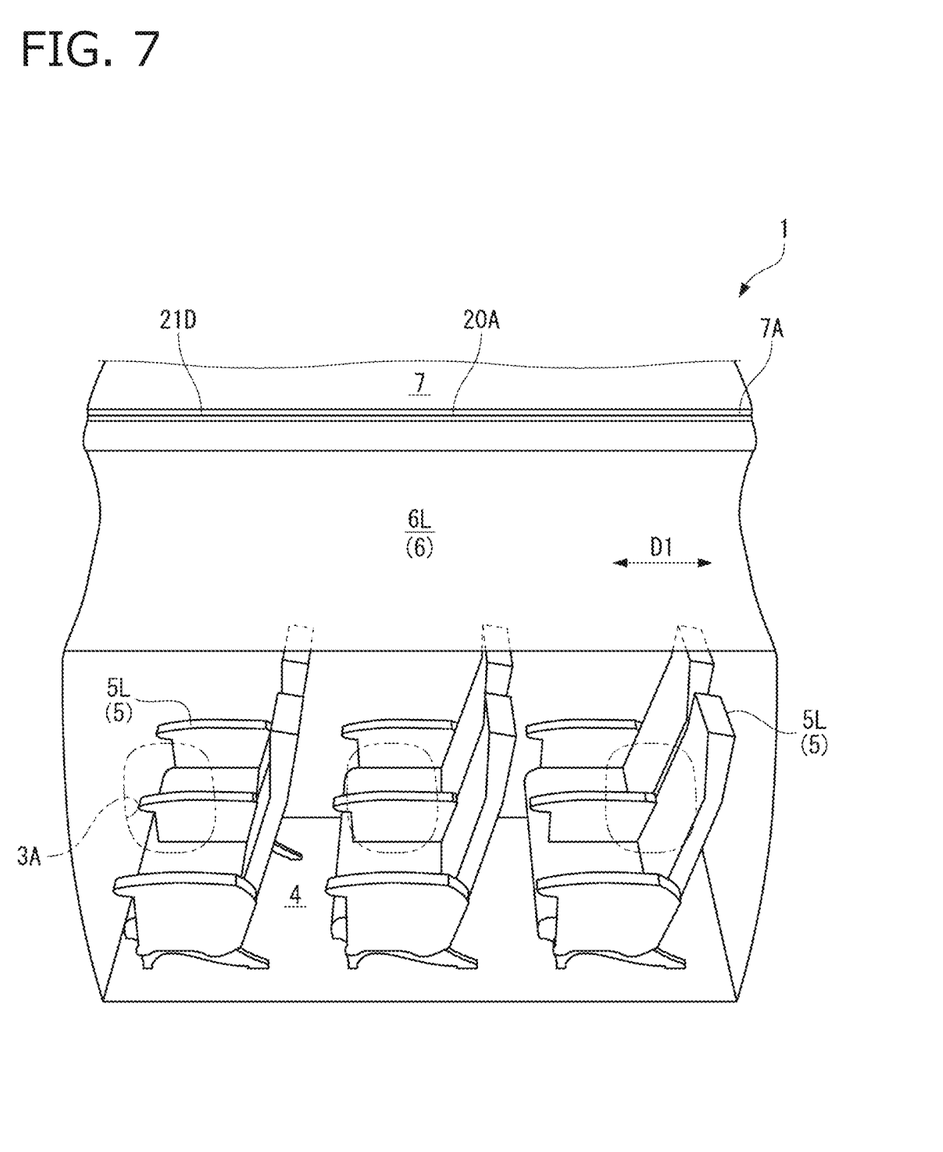
FIG. 7 is a diagram illustrating a blowout port continuous in an axis direction of the airframe of the aircraft according to a modification of the present invention.

As illustrated in FIG. 7, a blowout portion 21 that includes a blowout port 20A continuous in the axis direction D1 is a chamber elongated in the axis direction D1. As illustrated in FIGS. 8A and 8B, the blowout portion 21 receives the conditioned air from a plurality of blowout upstream portions 22 that guide the conditioned air to the vicinity of the ceiling 7, and blows out the conditioned air from the slit-like blowout port 20A to the cabin space 2A.

As with the blowout portions 11 (FIG. 3), the blowout portion 21 is provided on each of the starboard side and the port side as a terminal end part of each of the air-conditioning ducts 10R and 10L. FIG. 8A illustrates the blowout portion 21 on the port side. As illustrated in FIG. 8A, the blowout portion 21 is located above each of the baggage storage portions 6R and 6L in the vicinity of the ceiling 7.

The blowout portion 21 has a length corresponding to the plurality of blowout upstream portions 22 arranged in the axis direction D1. The plurality of blowout upstream portions 22 arranged in the axis direction D1 are connected to a wall 211 on the downstream side of the blowout portion 21.

Figure 8A:
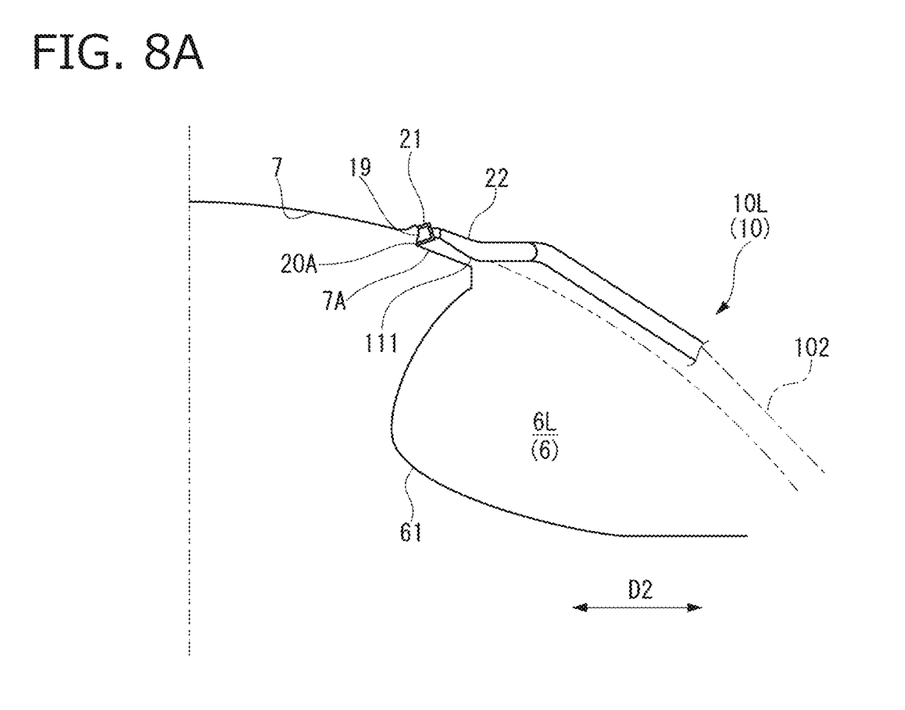
FIG. 8A is a diagram illustrating a part of a ceiling and a cross-section of the blowout port that receives conditioned air from a plurality of air-conditioning ducts and blows out the conditioned air from the blowout port illustrated in FIG. 7.

As illustrated in FIG. 8A, the terminal end side of the blowout portion 21 is inclined downward with respect to the horizontal direction because the blowout upstream portions 22 are curved. Accordingly, the blowout portion 21 blows out the conditioned air to the cabin 2 from the outboard side of the ceiling 7 toward the inboard side of the ceiling 7 and toward the lower part than the ceiling 7.

Figure 8B:
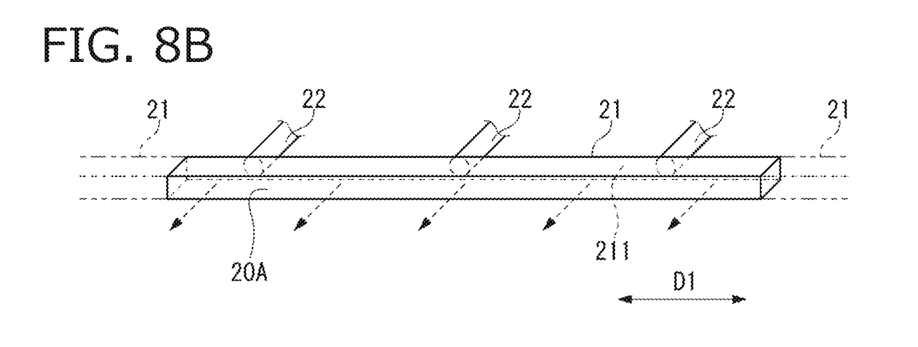
FIG. 8B is a diagram illustrating an exemplary configuration of the blowout portion that blows out the conditioned air from the blowout port illustrated in FIG. 7.

As illustrated in FIG. 8B, two or more blowout portions 21 can be adjacently disposed without a gap while being in contact with one another in the axis direction D1. In this case, a single outlet member 21D (FIG. 7) that serves as the blowout port 20A can be provided over the plurality of adjacent blowout portions 21. This makes it possible to reduce the number of parts and to improve appearance.

The blowout portion 21 may have a length over the entire cabin 2 in the axis direction D1. In this case, all of the plurality of blowout upstream portions 22 arranged in the axis direction D1 in the region of the cabin 2 are connectable to the single blowout portion 21.

The conditioned air is uniformly jetted in the direction separated from the ceiling 7 from blowout portion 21 along the axis direction D1. Therefore, it is possible to prevent adhesion of the conditioned air to the ceiling 7 to suppress unevenness of the wind speed in the vertical direction and the right-left direction D2 as with the above-described embodiment. In addition, it is possible to further uniformize the wind speed distribution in the axis direction D1.

Note that, the configuration similar to the configuration of the above-described modification is obtainable by adjacently arranging the blowout portions 11 (FIG. 5A) according to the above-described embodiment so as to be in contact with one another in the axis direction D1, and uniformization of the wind speed distribution in the axis direction D1 is more sufficiently achievable.

Other than the above, the configurations described in the above-described embodiment can be selected or appropriately modified without departing from the scope of the present invention.

The blowout portions 11 of the air-conditioning ducts 10R and 10L according to the present invention may each have a width that is gradually increased over an upstream end to a downstream end without being drastically increased at a certain position.

In each of the blowout portions 11 of the air-conditioning ducts 10R and 10L according to the present invention, the flow path cross-sectional area is not necessarily expanded relative to the upstream portion as long as the conditioned air is blown out from the blowout portions 11 to the cabin 2 from the outboard side of the ceiling 7 toward the inboard side of the ceiling 7 and toward the lower part than the ceiling 7. Even when the flow path cross-sectional area is not made larger than the flow path cross-sectional area of the upstream portion, adhesion of the jet flows of the conditioned air blown out from the blowout portions on the starboard side and the port side to the ceiling 7 is prevented. In this case, it is permitted that the merging position C of the jet flows is slightly deviated from the center (position of axis) of the cabin 2 in the right-left direction D2. Adhesion of the jet flows of the conditioned air to the ceiling 7 is prevented, which makes it possible to supply the conditioned air to the lower part of the seats 5. Accordingly, it is possible to reduce the temperature difference in the vertical direction.

The position of the passage 9 and the positions of the baggage storage portions 6 are changed, and the form of the ceiling 7 is also changed depending on layout of the seats 5 in the cabin 2. For example, a case where the seats 5 are disposed in three regions of a right region, a center region, and a left region, two passages 9 are each provided between the adjacent regions, and three baggage storage portions are provided above the respective regions is considered. In this case, the ceiling 7 is exposed at two positions, namely, between a left baggage storage portion and a center baggage storage portion and between the center baggage storage portion and a right baggage storage portion. In this case, the blowout portions 11 of the air-conditioning ducts according to the present invention are symmetrically provided near a ceiling exposed part on the left side, and the blowout portions 11 of the air-conditioning ducts according to the present invention are also symmetrically provided near a ceiling exposed part on the right side. This makes it possible to prevent adhesion of the conditioned air to the ceiling, and to uniformize the wind speed distribution and the temperature distribution inside the cabin.

The air-conditioning duct structure 100 according to the present invention is applicable to the other pressurized compartments such as a cockpit without being limited to the cabin 2.

What is claimed is:

1. An air-conditioning duct structure of an aircraft, the air-conditioning duct structure comprising:
   an air-conditioning duct that is provided on each of a starboard side and a port side of a pressurized compartment of the aircraft and is configured to guide conditioned air to a vicinity of a ceiling of the pressurized compartment of the aircraft, wherein
   the air-conditioning duct on each of the starboard side and the port side includes a blowout portion and a blowout upstream portion, the blowout portion blowing out the conditioned air to the pressurized compartment from an outboard side of the ceiling to an inboard side of the ceiling and toward a space below the ceiling, and the blowout upstream portion communicating with an upstream side of the blowout portion,
   for each of the starboard side and the port side, the blowout portion or the blowout upstream portion is curved to cause a terminal end side of the blowout portion to be inclined downward with respect to a horizontal direction, a jet flow from the blowout portion on the starboard side merges with a jet flow from the blowout portion on the port side to form a merged flow at a center part between the blowout portion of the starboard side and the blowout portion of the port side, and the merged flow blows downward while being diffused, the jet flow from the blowout portion on the starboard side and the jet flow from the blowout portion on the port side are directed downward at an equal angle relative to the horizontal direction, and blow out at substantially equal speeds, the ceiling is exposed between a baggage storage portion on the starboard side and a baggage storage portion on the port side in a right-left direction, the baggage storage portion on the starboard side and the baggage storage portion on the port side being located above seats of the pressurized compartment, the blowout portion on the starboard side opens above the baggage storage portion on the starboard side, the blowout portion on the port side opens above the baggage storage portion on the port side, a terminal end part of the blowout portion on the starboard side is disposed near a right end of the ceiling and at a boundary between the baggage storage portion on the starboard side and the ceiling, the blowout portion on the starboard side opens at the terminal end part of the blowout portion on the starboard side from the outboard side to the inboard side, a terminal end part of the blowout portion on the port side is disposed near a left end of the ceiling and at a boundary between the baggage storage portion on the port side and the ceiling, and the blowout portion on the port side opens at the terminal end part of the blowout portion on the port side from the outboard side to the inboard side.

2. The air-conditioning duct structure of the aircraft according to claim 1, wherein for both the starboard side and the port side, the air-conditioning duct extends between an inner wall of a cabin and a skin and between the baggage storage portion and the skin to the blowout portion.

3. The air-conditioning duct structure of the aircraft according to claim 1, wherein the blowout portion on the starboard side and the blowout portion on the port side are configured in symmetrical shapes.

4. The air-conditioning duct structure of the aircraft according to claim 3, wherein a position of a passage between seats on the starboard side and seats on the port side in the pressurized compartment corresponds to a center part of the pressurized compartment in a right-left direction.

5. The air-conditioning duct structure of the aircraft according to claim 1, wherein for both the starboard side and the port side, the blowout portion has a flow path cross-sectional area that is made larger than a flow path cross-sectional area of the blowout upstream portion.

6. The air-conditioning duct structure of the aircraft according to claim 5, wherein for both the starboard side and the port side, the blowout portion has the flow path cross-sectional area that is made larger in an axis direction of the aircraft than the flow path cross-sectional area of the blowout upstream portion.

7. The air-conditioning duct structure of the aircraft according to claim 6, wherein for both the starboard side and the port side, the blowout portion comprises a flow rectifier disposed perpendicular to a flow of the conditioned air and that rectifies flow of the conditioned air at a position where the flow path cross-sectional area is larger than the flow path cross-sectional area of the blowout upstream portion.

8. The air-conditioning duct structure of the aircraft according to claim 6, wherein for both the starboard side and the port side, the blowout portion comprises a widened portion and a flat portion, the widened portion being gradually expanded in the axis direction of the aircraft relative to the blowout upstream portion, and the flat portion communicating with a downstream side of the widened portion and having a flat cross-section.

9. The air-conditioning duct structure of the aircraft according to claim 8, wherein for both the starboard side and the port side, the blowout portion comprises a flow rectifier disposed perpendicular to a flow of the conditioned air and that rectifies flow of the conditioned air at a position where the flow path cross-sectional area is larger than the flow path cross-sectional area of the blowout upstream portion, and the flow rectifier is provided in the flat portion.

10. The air-conditioning duct structure of the aircraft according to claim 5, wherein for both the starboard side and the port side, the blowout portion comprises a flow rectifier disposed perpendicular to a flow of the conditioned air and that rectifies flow of the conditioned air at a position where the flow path cross-sectional area is larger than the flow path cross-sectional area of the blowout upstream portion.

11. The air-conditioning duct structure of the aircraft according to claim 10, wherein the flow rectifier is made of a punched metal.

12. The air-conditioning duct structure of the aircraft according to claim 1, wherein for both the starboard side and the port side, the blowout portion is continuous along an axis direction of the aircraft, and receives the conditioned air from the blowout upstream portion configured to guide the conditioned air to a vicinity of the ceiling to blow out the conditioned air.

13. An aircraft, comprising:
the air-conditioning duct structure according to claim 1; and
the pressurized compartment.

14. An air-conditioning duct structure of an aircraft, comprising:

an air-conditioning duct that is provided on each of a starboard side and a port side of a pressurized compartment of the aircraft and is configured to guide conditioned air to a vicinity of a ceiling of the pressurized compartment of the aircraft, wherein the air-conditioning duct on each of the starboard side and the port side includes a blowout portion and a blowout upstream portion, the blowout portion blowing out the conditioned air to the pressurized compartment from an outboard side of the ceiling to an inboard side of the ceiling and toward a space below the ceiling, and the blowout upstream portion communicating with an upstream side of the blowout portion, for each of the starboard side and the port side, the blowout portion or the blowout upstream portion is curved to cause a terminal end side of the blowout portion to be inclined downward with respect to a horizontal direction, a jet flow from the blowout portion on the starboard side merges with a jet flow from the blowout portion on the port side to form a merged flow at a center part between the blowout portion of the starboard side and the blowout portion of the port side, and the merged flow blows downward while being diffused, the jet flow from the blowout portion on the starboard side and the jet flow from the blowout portion on the port side are directed downward at an equal angle relative to the horizontal direction, and blow out at substantially equal speeds, for both the starboard side and the port side, the blowout portion has a flow path cross-sectional area that is made larger in an axis direction of the aircraft than a flow path cross-sectional area of the blowout upstream portion, for both the starboard side and the port side, the blowout portion is expanded in the axis direction of the aircraft relative to the blowout upstream portion, a plurality of the blowout portions individually corresponding to a plurality of the air-conditioning ducts are disposed along one straight line parallel to the axis direction with intervals, each of the intervals being less than or equal to ½ of a length of each of the blowout portions in the axis direction, and the plurality of the air-conditioning ducts include the air-conditioning duct of each of the starboard side and the port side.

\* \* \* \* \*